(12) United States Patent
Ritz

(10) Patent No.: US 8,550,946 B2
(45) Date of Patent: Oct. 8, 2013

(54) NON-CIRCULAR JOINT OPENINGS IN TOOTHED PLATES OF SILENT CHAINS

(75) Inventor: Andreas Ritz, Munich (DE)

(73) Assignee: IWIS Motorsysteme GmbH & Co. KG, Munich (DE)

( * ) Notice: Subject to any disclaimer, the term of this patent is extended or adjusted under 35 U.S.C. 154(b) by 0 days.

(21) Appl. No.: 12/911,354

(22) Filed: Oct. 25, 2010

(65) Prior Publication Data

US 2011/0287883 A1    Nov. 24, 2011

(30) Foreign Application Priority Data

Oct. 23, 2009    (DE) .................. 10 2009 050 509

(51) Int. Cl.
*F16G 13/04* (2006.01)
*F16G 13/06* (2006.01)

(52) U.S. Cl.
USPC .......................................................... 474/213

(58) Field of Classification Search
USPC .......... 474/206, 212–215, 217, 219, 225, 229
See application file for complete search history.

(56) References Cited

U.S. PATENT DOCUMENTS

| 3,535,871 | A | * | 10/1970 | Jeffrey | ................... | 59/8 |
| 4,010,656 | A | | 3/1977 | Jeffrey | | |
| 4,227,425 | A | * | 10/1980 | Bendall | ................ | 474/213 |
| 5,236,399 | A | | 8/1993 | Sugimoto et al. | | |
| 5,464,374 | A | * | 11/1995 | Mott | ................ | 474/224 |
| 6,435,996 | B2 | * | 8/2002 | Horie et al. | ................ | 474/213 |
| 8,167,751 | B2 | * | 5/2012 | Gramby et al. | ................ | 474/206 |
| 2002/0061800 | A1 | * | 5/2002 | Saito | ................ | 474/212 |
| 2007/0191164 | A1 | | 8/2007 | Ispolatova et al. | | |
| 2008/0300079 | A1 | * | 12/2008 | Botez et al. | ................ | 474/213 |
| 2010/0069188 | A1 | * | 3/2010 | Adachi et al. | ................ | 474/213 |

FOREIGN PATENT DOCUMENTS

| DE | 1625866 | 3/1970 |
| DE | 101 13 460 A1 | 11/2001 |
| EP | 0194037 B1 | 3/1990 |
| GB | 2 436 359 A | 9/2007 |
| JP | 1-91149 U | 6/1989 |

OTHER PUBLICATIONS

Japanese Office Action mailed Oct. 11, 2012 in the corresponding Japanese Application No. 2010-238737.

* cited by examiner

*Primary Examiner* — Michael Mansen
*Assistant Examiner* — Mark K Buse
(74) *Attorney, Agent, or Firm* — Baker & Hostetler LLP

(57) ABSTRACT

A round-pin-joint toothed chain is provided that comprises alternating outer and inner chain links which are pivotably interconnected via a chain joint including round pins that are circular in cross-section, the outer chain links comprising two parallel, spaced-apart outer plates and at least one centered toothed extension plate disposed between the outer plates, and the inner chain links comprising at least two inner toothed plates, said at least two inner toothed plates and said at least one toothed extension plate having each two joint openings, which are arranged in spaced relationship with one another on the longitudinal axis of the inner toothed plate and of the toothed extension plate, respectively, and which are associated with the end faces of the inner toothed plates and of the toothed extension plate, respectively, and a respective round pin extending through one of the joint openings.

10 Claims, 3 Drawing Sheets

NON-CIRCULAR JOINT OPENINGS IN TOOTHED PLATES OF SILENT CHAINS

CROSS-REFERENCE TO RELATED APPLICATIONS

This application claims priority to foreign Patent Application DE 10 2009 050 509.1, filed on Oct. 23, 2009, the disclosure of which is incorporated herein by reference in its entirety.

FIELD OF THE INVENTION

The present invention relates to a toothed chain. More particularly, the present invention relates to a round-pin-joint toothed chain.

BACKGROUND OF THE INVENTION

Toothed chains are preferably used for transmitting power in internal combustion engines, e.g. as timing chains. Conventional toothed chains consist of alternating outer and inner chain links, the outer chain link comprising two outer plates and at least one toothed extension plate disposed centrally on joint pins. The outer plates and, optionally, also the toothed extension plates of the outer chain link are press-fitted on the joint pin. Other than the toothed extension plates, the outer plates are normally implemented as guide plates, but there are also versions in which at least one guide plate is disposed in the middle of the outer chain link, or in which outer guide plates are additionally provided, whereas the actual outer plates are also implemented as toothed plates. The individual outer chain links are interconnected by means of inner chain links, which, normally, each consist of at least two individual inner toothed plates, or stacks of inner toothed plates, the inner toothed plates of the inner chain links being pivotably arranged on the joint pins, so that each roundpin chain joint is defined by a round pin of the outer chain joint and the joint openings of the inner toothed plates of the inner chain link. Depending on the respective structural design of the toothed chain, the toothed extension plates are arranged centrally between the outer plates or more closely to one of the outer plates. It is here even possible that the toothed extension plate borders directly on the outer plates, whereas a single inner toothed plate or a stack of inner toothed plates is provided between the toothed extension plates. Depending on the requirements that have to be satisfied by the toothed chain, the inner toothed plates and the toothed extension plates may be identical, which makes production of the plate and mounting of the toothed chain simple. There are, however, also toothed chains that make use of different toothed plates for the inner toothed plates of the inner chain link and the toothed extension plates of the outer chain link.

Whereas the outer plates have openings for the joint pins, whose diameter is smaller than the diameter of the joint pins, so as to allow press fitting for the interference fit of the outer plates, the joint openings of the inner toothed plates and, optionally, of the toothed extension plates have a diameter which is slightly larger than the diameter of the joint pin so as to allow especially a pivotable mode of arrangement of the inner toothed plates of the inner chain link on the joint pin.

These and other known toothed chains are well-established for the respective case of use and have proved to be successful in operation. Nevertheless, the round joint pin is, depending on its hardness, susceptible to bending in such a conventional version of a round-pin-joint toothed chain, whereas in particular the joint opening of the inner toothed plates is subjected to wear due to the movement of the joint pin in the joint opening, especially in cases where hardened joint pins are used. In the case of conventional toothed chains these problems result in an elongation of the toothed chain due to bending of the joint pin, or in increased wear of the round-pin chain joint, and, consequently, in a limitation of the service life of the toothed chain as a whole.

SUMMARY OF THE INVENTION

One aspect of the present invention improves the wear behavior and the strength properties of roundpin-joint toothed chains.

In addition, due to the progressive technical development taking place also in the case of well-established products, such as toothed chains, there is a constant pressure to innovate the existing structural designs continuously. Especially in the field of automotive industry, the normally existing cost pressure in combination with high piece numbers always leads to a constant necessity of innovating products and their properties for the purpose of improvement, so as to save costs by optimizing the production process and/or by reducing the amount of material used.

In the case of a round-pin-joint toothed chain of the type in question, another aspect of present invention provides that at least one inner toothed plate and/or the at least one toothed extension plate are configured as toothed plates with non-circular joint openings, each joint opening of the toothed plate having, on the side of the joint opening facing the respective end face of the toothed plate, at least a first, a second and a third curvature, the first curvature, which has a first curvature radius, being arranged in the area of the point of intersection of the longitudinal axis and of the contour of the joint opening, the second curvature, which has a second curvature radius, being arranged above the longitudinal axis and in front of a straight line, which extends perpendicular to the longitudinal axis of the toothed plate and which intersects the axis of the round pin, and the third curvature, which has a third curvature radius, being arranged below the longitudinal axis and in front of the straight line, which extends perpendicular to the longitudinal axis of the toothed plate and which intersects the axis of the round pin, the second curvature radius and the third curvature radius being larger than the first curvature radius.

The use of a plurality of curvatures with different curvature radii on the side of a non-circular joint opening facing the respective end face of the toothed plate, instead of a conventional circular shape of the joint opening with a slightly larger radius than the radius of the round pin, which is normally circular in cross-section, leads, due to the non-circular contour of the joint openings, to a reduction of the maximum fatigue load on the round-pin chain joint of a toothed chain. The curvatures in the areas of the joint opening subjected to high loads have here a curvature radius which is larger than that of conventional round joint openings. The strength of the round-pin joint can be increased substantially in this way, and this allows, in the case of identical operational demands on a round-pin-joint toothed chain, the use of a less expensive toothed chain having a smaller pitch or comprising thinner toothed plates and/or a smaller number of toothed plates. It will be advantageous when the area of the joint opening contour in which the first curvature is arranged extends, by at least ±15°, preferably by at least ±30°, in particular by at least ±45°, about the point of intersection of the longitudinal axis and of the contour of the joint opening, on the joint opening side facing the associated end face. It is here not absolutely necessary that the first curvature extends uniformly or completely within this area.

In addition, the second and third curvatures may be arranged not only on the joint opening side facing the end face, but they may extend from said side up to and beyond the straight 4 line, which extends perpendicular to the longitudinal axis and intersects the axis of the round pin, and into the joint opening side facing away from said end face, so that it will at least only be necessary to provide an initial area of the respective curvature in the area facing the end face. In the case of the structural design of the round-pin-joint toothed chain according to the present invention, the second and third curvatures relieve especially the joint opening areas subjected to increased mechanical load in the area of the point of intersection between the straight line, which extends perpendicular to the longitudinal axis of the toothed plate and intersects the axis of the round pin, and the contour of the joint opening above and below the longitudinal axis. In order to achieve such an increase in strength, the transition between the first curvature and the second and third curvatures, respectively, is preferably implemented as a continuous or tangential transition. Accordingly, the centers of the second and third curvature radii are located beyond the straight line intersecting the round pin axis, on the side facing away from the end face.

With respect to the forces that are to be transmitted by a conventional round-pin-joint toothed chain, especially when said chain is used in internal combustion engines, it will normally be necessary to use toothed chains comprising a plurality of alternating toothed plates or toothed plate stacks, so that, in addition to at least one toothed extension plate or a stack of toothed extension plates, at least two individual inner toothed plates with noncircular joint openings or stacks of inner toothed plates with non-circular joint openings are provided.

Preferably, the size of the first curvature radius may exceed that of the radius of the round pin by 1% to 3%, said round pin being normally circular in shape. The slightly larger dimensions of the first curvature radius in comparison with the dimensions of the circular round pin allows a good sliding fit between the first curvature and the round pin, thus leading to uniform running of the toothed chain as well as to a high degree of running smoothness. This kind of selection of the radii will also reliably avoid a tolerance-conditioned oversize of the joint pins in comparison with the first curvature. It is thus possible to keep the necessary tolerances small when the round pins and joint openings of the toothed plates are being produced, i.e. the production costs can be kept low as well. The ratio of the first curvature radius to the radius of the round pin corresponds approximately to the ratio of the radii of circular joint openings and round pins of conventional round-pin chain joints of toothed chains with pivotable inner toothed plates.

For improving the fatigue strength, the size of the second and third curvature radii of the second and third curvatures may exceed that of the first curvature radius by at least 5%, preferably by at least 10%. A significant improvement of the fatigue strength of the chain joint requires, especially in comparison with the only slightly enlarged first curvature radius, a substantial increase in size of the second and third curvature radii so as to achieve in areas subjected to higher loads a sufficient reduction of the mechanical load for increasing thus the load bearing capacity of the round-pin-joint toothed chain. The second and third curvatures may also be very shallow and may even assume an approximately or actually linear shape, so that the second and third curvature radii may become very large and even infinitely large.

An advantageous embodiment is so conceived that the second curvature radius and the third curvature radius are not identical. In comparison with the significant increase in the fatigue strength obtained by identical curvature radii for the second and third curvatures, non-identical curvature radii for the second and third curvatures will improve the fatigue strength of the round-pin chain joint still further. In this respect, it is, for a start, irrelevant which of the two curvature radii is larger or smaller, since the strength can be improved still further in either case.

Another embodiment of the round-pin-joint toothed chain according to the present invention is so conceived that, on the side of the joint opening facing away from the respective end face of the toothed plate, each of the non-circular joint openings of the toothed plates has a fourth curvature with a fourth curvature radius. The fourth curvature defines a curved termination of the joint opening on the joint opening side located opposite the first curvature, and interconnects the second curvature and the third curvature. In order to avoid faults in the articulating function of the round-pin chain joint, the fourth curvature radius may be at least 2.0 times, preferably at least 2.5 times as large as the first curvature radius. Alternatively, the fourth curvature may also assume a very shallow shape, and even an approximately or actually linear shape, without exerting any negative influence on the sliding function of the round pin in the joint openings.

An expedient embodiment is so conceived that a respective transition curvature is provided between the second curvature and the fourth curvature as well as between the third curvature and the fourth curvature. These transition curvatures allow easy and reliable punching and shaving of the joint openings of the toothed plates, so that the load-bearing cut face will extend over the largest possible area of the thickness of the toothed plate not only in the area of the transition curvature but also in the other, adjoining areas. The larger the area of the load-bearing cut face in the joint opening is, the more advantageous the sliding behavior of the toothed plates on the round pins of the chain joint will be. According to an advantageous embodiment, the curvature radius of the transition curvature may be 0.5 times to 0.8 times as large as the first curvature radius. It is thus possible to achieve a gentle transition from the second and third curvatures to the fourth curvature, so that the load acting on the cutting tools during punching and shaving of the joint opening will be as low as possible.

In order to provide two mating joint components having the highest possible wear resistance, the round pins of the round-pin chain joint can be case-hardened, heat-treated and short-time gas nitrided and/or provided with a coating of chromium carbide, vanadium carbide or chromium nitride. The hardened and/or coated round pins can, when used in combination with the joint openings which are formed in the associated steel toothed plates and which are improved in strength and wear resistance, increase the service life of the toothed chain as a whole still further, since the hardened round pins will reduce bending of the round pins and thus prevent an elongation of the toothed chain.

BRIEF DESCRIPTION OF THE DRAWINGS

In the following, an embodiment of the present invention will be explained in more detail making reference to the drawings enclosed, in which.

DETAILED DESCRIPTION

Figure 1:
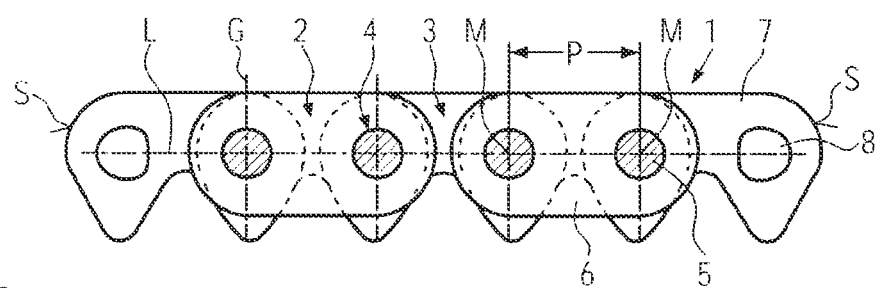
FIG. 1 shows a side view of a round-pin-joint toothed chain according to an embodiment of the present invention.
Figure 2:
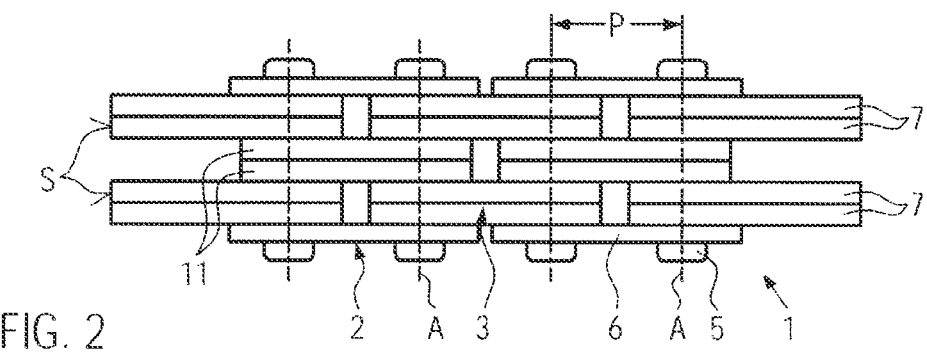
FIG. 2 shows a top view of the round-pin-joint toothed chain according to FIG. 1.

FIGS. 1 and 2 show a round-pin-joint toothed chain 1 comprising alternating outer chain links 2 and inner chain links 3 which are interconnected via a respective chain joint 4 including a round pin 5 that is circular in cross-section. The outer chain links 2 consist of two lateral outer plates 6, which are disposed on the outside in parallel spaced relationship with one another, and of two centered extension plates, which are disposed on the inside and arranged as a stack, said extension plates being implemented as toothed extension plates 11. In the embodiment shown, the outer plates 6 are implemented as guide plates without projecting teeth and without any recessed areas allowing engagement of the teeth of an associated chain wheel. Alternatively, the outer plates 6 may be implemented as toothed plates. In addition to or alternatively to the outer plates 6, which are implemented as guide plates, inner guide plates may optionally be provided. The outer plates 6 are press-fitted on the round pins 5 of the chain joints 4, so that the toothed extension plates 11 of the outer chain link 2, which are arranged between two associated outer plates 6, as well as the (inner) toothed plates 7 of the adjoining inner chain links 3 are held in position relative to one another. In addition, also the toothed extension plates 11 may optionally be press-fitted on the round pins 5.

The pitch P between the outer chain links 2 and the inner chain links 3 is determined by the distance between the joint axes A of the round pins 5 (FIG. 2) or the distance between the centers M of the round pins 5 (FIG. 1). Also the longitudinal axis L of the toothed plates 7 extends through these centers M of the round pins 5, which are shown in a cross-section executed in the plane of the plates, the longitudinal axis L extending normally also through the centers of the joint openings 8 of the toothed plates 7 and dividing the toothed plate into an upper back half and a lower tooth half. At right angles to the longitudinal axis L, a straight line G extends through the centre M of the round pins 5, said straight line G dividing the respective joint openings 8 into a side facing the end face S of the toothed plate 7 and a side facing away from said end face S. The respective round pins 5 of the chain joints 4 extend between the outer plates 6, which are arranged on the outside, and through the joint openings 8 of the inner toothed plates 7 and the extension plates 11, so that a pivotable connection is established between the outer chain links 2 and the inner chain links 3.

Figure 3:
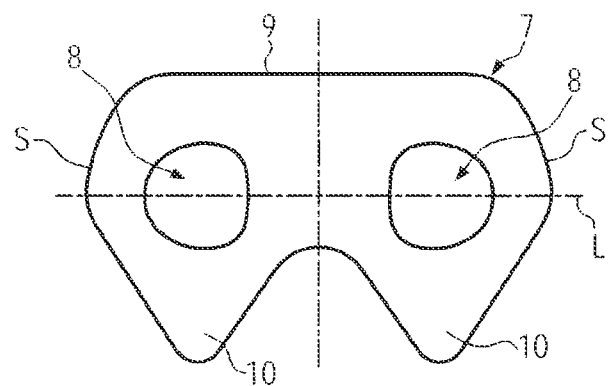
FIG. 3 shows an enlarged side view of a toothed plate according to FIG. 1.

FIG. 3 shows a side view of a toothed plate 7 with two non-circular joint openings 8 associated with the respective end faces S of the toothed plate 7. In the embodiment shown, the toothed plate 7 is used as an inner toothed plate of the inner chain links 3 and, optionally, it is also used for the toothed extension plates 11. In the upper back half located above the longitudinal axis L, the toothed plate 7 has a substantially straight back portion 9, whereas in the lower toothed plate half, which is located below the longitudinal axis L, two teeth 10 project, which are interconnected by a receding tooth gap. The contour of the joint opening 8 is non-circular and comprises a plurality of adjoining curvature sections having different radii of curvature. The different curvature sections are clearly visible once more in the side view of the toothed plate 7 shown in FIG. 4, where it is also shown how the round pin 5, which is circular in cross-section, extends through the joint opening 8. The round pin 5 has a pin radius rb which is clearly smaller than the respective radii of the larger curvature sections of the joint opening 8, the difference to the pin radius rb and the distance between the round pin 5 and the contour of the joint opening 8 increasing, in total, from the side of the joint opening 8 facing the end face S of the toothed plates 7 to the side facing away from said end face S.

Figure 4:
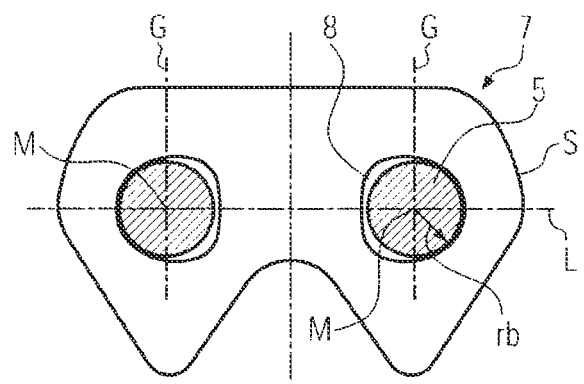
FIG. 4 shows an enlarged side view of a toothed plate and of the associated round pins of the chain joints according to FIG. 1.
Figure 5:
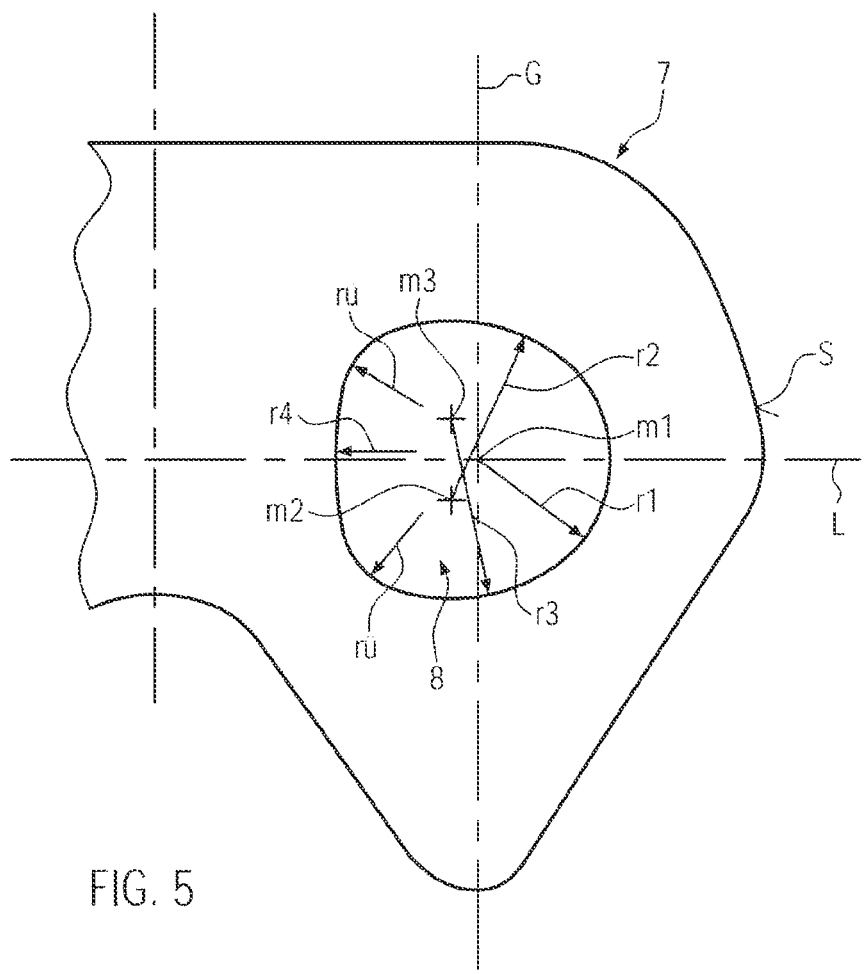
FIG. 5 shows a detailed view of the joint opening of the toothed plate according to FIG. 3.

The different curvatures are clearly visible once more in the enlarged representation of the joint opening 8 shown in FIG. 5. The joint opening 8 of the toothed plate 7 has a first curvature with a first curvature radius r1 on the side of the joint opening 8 facing the end face S of the toothed plate 7, said first curvature radius r1 being, as can be seen in FIG. 4, slightly larger than the pin radius rb. Following this first curvature, a second and a third curvature are provided on the side of the joint opening 8 facing the end face S of the toothed plate 7, said second curvature, which has a second curvature radius r2, adjoining the first curvature above the longitudinal axis L, and said third curvature, which has a third curvature radius r3, adjoining the first curvature below the longitudinal axis L. Both the second curvature radius r2 and the third curvature radius r3 are larger than the first curvature radius r1. Due to the larger curvature radii, the associated second and third centers m2, m3 of the second and third curvature radii r2, r3 are located on the side of the straight line G facing away from the end face S and on the respective side of the longitudinal axis L facing away from the associated curvatures. The first centre m1 of the first curvature radius r1, however, is located on the longitudinal axis L and, depending on the difference to the pin radius rb, at the point of intersection with the straight line G or, displaced by said difference, on the side of the straight line G facing away from the end face S. For improving the fatigue strength still further, the second curvature radius r2 and the third curvature radius r3 are not identical. The difference only amounts to 1 to 2% so as to accomplish an increase in strength in comparison with identical curvature radii for the second and third curvatures.

On the side of the non-circular joint opening 8 facing away from the respective end face S of the toothed plate 7, a fourth curvature having a fourth curvature radius r4 is provided, said fourth curvature extending from the upper side of the toothed plate 7 to the lower side of the toothed plate 7. The fourth curvature establishes a connection between the second curvature, which is provided above the longitudinal axis L and which faces the back portion 9, and the third curvature, which is provided below the longitudinal axis L and which faces the projecting teeth 10, and limits thus the overall size of the joint opening 8 to a size appropriate in comparison with the round pin 5 and amounting to approx. 1.1 to 1.2 times the cross-sectional area of said round pin 5. The curvature radius r4 of the fourth curvature is, in most cases, substantially larger than the curvature radii r1 to r3 of the first to third curvatures. In the embodiment shown, the curvature radius r4 of the fourth curvature is approximately three times as large as the curvature radius r1 of the first curvature, and approximately twice as large as the curvature radii r2 and r3 of the second and third curvatures. A respective transition curvature having a small curvature radius ru is provided between the fourth curvature and the second and third curvatures, respectively, so as to form a gentle transition in order to facilitate production of the joint opening 8 by means of rough punching and shaving. This improves the cutting result on the toothed plate 7 and reduces the necessary cutting force as well as the wear occurring on the cutting punch.

For a commercially available round-pin-joint toothed chain having a pitch of 8 mm, a thickness of the toothed plate 7 of 1.3 mm and a pin radius rb of 1.564 to 1.581 mm, making use of a hardened round pin 5, which has a circular cross-section and which is preferably casehardened, heat-treated and short-time gas nitrided and/or provided with a coating of chromium carbide, vanadium carbide or chromium nitride, an embodiment of a round-pin-joint toothed chain 1 according to the present invention results, for example, in the curvature relationships of the joint opening 8 following herein below. The curvature radius r1 of the first curvature on the side of the joint opening 8 facing the end face S is 1.6 mm. The second curvature radius r2 of the second curvature, adjoining said first curvature above the longitudinal axis L, is 2.2 mm, whereas the third curvature radius r3 of the third curvature, adjoining said first curvature below the longitudinal axis L, is 2.24 mm and, consequently, slightly larger. The fourth curvature provided on the side of the joint opening 8 facing away from the respective end face S of the toothed plate 7 has a fourth curvature radius r4 which is 4.5 mm, whereas the transition radii rü between the second and the fourth curvature and the third and the fourth curvature only amount to 1.0 mm. The material of the toothed plate 7 is normally steel, e.g., a manganese steel, e.g., 42MnB5, rolled in the direction of the longitudinal axis L. The contours of the joint opening as well as of the teeth 10 and of the back portion 9 are shaved in the production process.

In addition to the embodiment of the round-pin-joint toothed chain 1, which is shown in FIGS. 1 and 2 and which comprises two plate stacks, each consisting of two (inner) toothed plates 7 for the inner chain link 3, as well as a plate stack consisting of two toothed extension plates 11 for the outer chain joint, a larger number of plate stacks and/or a larger number of toothed plates 7 and toothed extension plates 11, with or without non-circular joint opening 8, per plate stack can be used for toothed chains of larger widths without limiting the structural design of a round-pin-joint toothed chain according to the present invention. Nor is it of any importance to the structural design of the round-pin-joint toothed chain 1 when the outer plates 6 are implemented as toothed plates or when inner guide plates are used alternatively or additionally.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

I claim:

1. A round-pin-joint toothed chain, comprising:
    alternating outer and inner chain links which are pivotably interconnected via a chain joint including round pins that are circular in cross-section, the outer chain links comprising two parallel, spaced-apart outer plates and at least one centered toothed extension plate disposed between the outer plates, and the inner chain links comprising at least two inner toothed plates, said at least two inner toothed plates and said at least one toothed extension plate having each two joint openings, which are arranged in spaced relationship with one another on a longitudinal axis of the inner toothed plate and of the toothed extension plate, respectively, the longitudinal axis extending between the two end faces of the inner toothed plates and of the toothed extension plate and extending through the center of the joint openings, and each joint opening is associated with one of the end faces of the inner toothed plates and of the toothed extension plate, respectively, and a respective round pin extending through one of the joint openings, wherein the teeth of the inner toothed plates and of the toothed extension plate, respectively, are arranged below the longitudinal axis,
    wherein the at least two inner toothed plates and/or the at least one toothed extension plate are configured as toothed plates with non-circular joint openings, each joint opening of the toothed plate having, on the side of the joint opening nearest the respective end face of the toothed plate, at least a first, a second and a third curvature, the first curvature, which has a first curvature radius, being arranged in the area of the point of intersection of the longitudinal axis and of the contour of the joint opening, the second curvature, which has a second curvature radius, being arranged above the longitudinal axis and on the side of the joint opening nearest the respective end face, and the third curvature, which has a third curvature radius, being arranged below the longitudinal axis and on the side of the joint opening nearest the respective end face, the first curvature radius being larger than the pin radius of the round pin which is circular in cross-section, and the second curvature radius and the third curvature radius being larger than the first curvature radius.

2. A round-pin-joint toothed chain according to claim 1, wherein the size of the second and third curvature radii exceeds that of the first curvature radius by at least 5%.

3. A round-pin-joint toothed chain according to claim 1, wherein the size of the second and third curvature radii exceeds that of the first curvature radius by at least 10%.

4. A round-pin-joint toothed chain according to claim 1, wherein the second curvature radius and the third curvature radius are not identical.

5. A round-pin-joint toothed chain according to claim 1, wherein, on the side of the joint opening facing away from the respective end face of the toothed plate, each joint opening has a fourth curvature with a fourth curvature radius.

6. A round-pin-joint toothed chain according to claim 5, wherein the fourth curvature radius is at least 2.0 times as large as the first curvature radius.

7. A round-pin-joint toothed chain according to claim 5, wherein the fourth curvature radius is at least 2.5 times as large as the first curvature radius.

8. A round-pin-joint toothed chain according to claim 5, wherein a respective transition curvature is provided between the second curvature and the fourth curvature as well as between the third curvature and the fourth curvature.

9. A round-pin-joint toothed chain according to claim 8, wherein the curvature radius of the transition curvature is 0.5 times to 0.8 times as large as the first curvature radius.

10. A round-pin-joint toothed chain according to claim 1, wherein the round pins of the chain joint are heat-treated and short-time gas nitrided and/or provided with a coating of chromium carbide, vanadium carbide or chromium nitride.

* * * * *